United States Patent
Kuroki et al.

(10) Patent No.: US 7,123,214 B2
(45) Date of Patent: Oct. 17, 2006

(54) INFORMATION PROCESSING METHOD AND APPARATUS

(75) Inventors: Tsuyoshi Kuroki, Tokyo (JP); Toshikazu Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 10/395,176

(22) Filed: Mar. 25, 2003

(65) Prior Publication Data
US 2003/0184602 A1 Oct. 2, 2003

(30) Foreign Application Priority Data
Mar. 29, 2002 (JP) ............................. 2002-095537

(51) Int. Cl.
*G09G 5/00* (2006.01)
*G09G 5/08* (2006.01)
(52) U.S. Cl. ........................................ 345/8; 345/158
(58) Field of Classification Search ................ 345/7–9, 345/156–178
See application file for complete search history.

(56) References Cited

U.S. PATENT DOCUMENTS

| | | | | |
|---|---|---|---|---|
| 4,768,028 A | * | 8/1988 | Blackie | 345/8 |
| 5,287,119 A | * | 2/1994 | Drumm | 345/158 |
| 5,323,174 A | * | 6/1994 | Klapman et al. | 345/156 |
| 5,367,315 A | * | 11/1994 | Pan | 345/156 |
| 5,457,641 A | * | 10/1995 | Zimmer et al. | 702/153 |
| 5,585,813 A | * | 12/1996 | Howard | 345/8 |
| 6,124,843 A | * | 9/2000 | Kodama | 715/856 |
| 6,204,828 B1 | * | 3/2001 | Amir et al. | 345/7 |
| 6,373,961 B1 | * | 4/2002 | Richardson et al. | 382/103 |
| 6,687,531 B1 | * | 2/2004 | Ferre et al. | 600/424 |

FOREIGN PATENT DOCUMENTS

| | | |
|---|---|---|
| JP | 5-290147 | 11/1993 |
| JP | 2000-020753 | 1/2000 |
| JP | 2000-102036 | 4/2000 |

* cited by examiner

*Primary Examiner*—Richard Hjerpe
*Assistant Examiner*—M. Fatahiyar
(74) *Attorney, Agent, or Firm*—Fitzpatrick, Cella, Harper & Scinto

(57) ABSTRACT

It is intended to solve the problem that, when an operator performs an operation using two-dimensional input means while seeing a picture frame seen from a viewpoint of the operator, an input operation is difficult to perform when the direction of the line of sight of the operator is unstable, since a designated direction greatly deviates in a world coordinate system. For that purpose, viewpoint information is detected, and an instruction of the operator for operating a position of a pointer image is input. A designated direction in a pointer coordinate system is obtained in accordance with the operator's instruction, and the pointer image is generated based on the designated direction. The pointer coordinate system is changed from the detected viewpoint information in accordance with a specific instruction of the operator.

12 Claims, 12 Drawing Sheets

INFORMATION PROCESSING METHOD AND APPARATUS

BACKGROUND OF THE INVENTION

1. Field of the Invention

The present invention relates to an information processing method and apparatus for displaying an image in which a pointer image operated by an operator is synthesized.

2. Description of the Related Art

In virtual reality (VR), it is possible to see a three-dimensional virtual space from a viewpoint of an operator using a display, such as an HMD (head mounted display) or the like, and perform an operation in such an environment. In mixed reality (MR), an operator can see a real space and three-dimensional virtual space in a superposed state using a see-through HMD.

In a telepresence system, an operator can perform an operation as if he is actually present at a remote location, by operating a camera provided at the remote location and performing the operation while seeing an image taken by the camera.

In such VR, MR or a telepresence system, an operator sometimes performs an operation for a real or virtual three-dimensional space. For example, the operator moves a virtual object within a three-dimensional virtual space, or designates an object in a real thee-dimensional space and displays information relating to the object on a display. Conventionally, such an operation is performed using a three-dimensional input device, such as a magnetic sensor, an optical sensor or the like, that can perform three-dimensional designation.

In contract to methods for inputting an operation for a three-dimensional space using a three-dimensional input device, methods for performing an operation in a three-dimensional space using a two-dimensional input device, such as a mouse or the like, have been known. As an example of such methods, a method for performing input to a three-dimensional space by obtaining a z-coordinate value in the direction of the depth from a designated position on screen coordinates (x, y) obtained by perspective transformation of a three-dimensional space from a previously prepared table, using an input device, such as a mouse or the like.

In any of such methods using a two-dimensional input device, an input operation is performed by operating a pointer by a two-dimensional input device in an image obtained by perspective transformation of a thee-dimensional space. An example of VR application software for inputting an operation from a two-dimensional input device for a three-dimensional space in such a conventional input method will now be described.

The operator mounts an HMD 201 shown in FIG. 1. The HMD 201 provides the operator with a three-dimensional virtual space. The HMD 201 includes a head-position/posture sensor 202 that outputs the position and the posture of the HMD 201. The operator has a two-dimensional input device 101 shown in FIG. 2 in his hand. The operator can input two-dimensional values using a two-dimensional pointing stick 102. That is, as shown in FIG. 2, the operator can input values (x, y)=(0, 0)–(100, 100) depending on the direction and the angle of inclination of the pointing stick 102. The two-dimensional input device 101 also includes a first button 103 and a second button 104.

FIG. 3 illustrates an outline of a three-dimensional virtual space presented to the operator using such application software. A three-dimensional virtual space 300 comprises a rectangular parallelepiped 301. Within the rectangular parallelepiped 301, virtual spheres A 302, B 303 and C 304 are floating. The operator is also present within the rectangular parallelepiped 301. Reference numeral 306 represents a world coordinate system whose origin is at a corner of the rectangular parallelepiped 301. FIG. 4 illustrates how the virtual space 300 is seen from the operator's viewpoint.

FIG. 5 represents a picture frame 500 displayed in the operator's HMD 201. The picture frame 500 has a width comprising 640 pixels and a height comprising 480 pixels. A coordinate position on the picture frame 500 is represented, for example, as (x, y)=(640, 480) making the upper left corner of the picture frame 500 the origin. A pointer 501 is displayed on the picture frame 500, and moves by the user's operation of the two-dimensional pointing stick 102. The pointer 501 moves on the picture frame 500 in accordance with the amount of operation of the pointing stick 102. In FIG. 5, the pointer 501 assumes a position of (x, y)=(490, 80).

When the operator depresses the first button 103, an object present under the pointer 501 is designated. For example, in FIG. 5, the pointer 501 is displayed in a state of being superposed with the virtual sphere A 302. Hence, when the operator depresses the first button 103, the virtual sphere A 302 is designated. At that time, determination whether or not the pointer 501 is present on the virtual sphere A 302 can be performed, for example, by acquiring the z buffer value of the coordinates (490, 80).

The above-described three-dimensional input device using a magnetic sensor or an optical sensor is generally expensive. Furthermore, since the number of objects to be measured at a time is sometimes limited depending on the sensor being used, it is sometimes impossible to measure the input device using a sensor. In addition, for example, in a three-dimensional input device using an optical sensor, measurement cannot be performed if a body or an object is present between a measuring apparatus and an object to be measured.

The above-described problem is solved by using a two-dimensional input device, such as a mouse or the like. However, in the conventional method of moving a pointer using a two-dimensional input device in an image obtained by performing perspective transformation of a three-dimensional space, if the direction of the operator's line of sight is unstable, the designated direction of the pointer greatly changes in the three-dimensional space. In other words, since the designated direction is defined by a field-of-view coordinate system, the designated direction greatly changes in a world coordinate system when the field-of-view coordinate system is not fixed.

For example, when the operator mounts an HMD, the designated direction greatly changes even if the position coordinates of the pointer do not change on the picture frame, if the operator's head fluctuates due to the weight of the HMD. Accordingly, in order to exactly designate an object in a three-dimensional space, the operator must fix his head, resulting in pain for the operator. This problem will now be described with reference to drawings.

FIG. 6 is a diagram illustrating the relationship between a world coordinate system 306 and a field-of-view coordinate system 601. The position and the posture of the field-of-view coordinate system 601 in the world coordinate system 306 are obtained from the head position/posture sensor 202. An image plane 602 is arranged relative to the field-of-view coordinate system 601. A designated direction 603 of the operator is represented by an arrow connecting the origin of the field-of-view coordinate system 601 and the pointer 501.

FIG. 7 is a diagram illustrating how the operator's designated direction 603 changes when the direction of the operator's line of sight changes due to fluctuation of the operator's head. As shown in FIG. 7, when the operator's line of sight changes, the relationship between the world coordinate system 306 and the line-of-sight coordinate system 601 changes, to change the positions of the image plane 602 and the pointer 501, thereby greatly changing the designated direction 603 in the world coordinate system 306.

FIG. 8 illustrates a picture frame 801 displayed in the operator's HMD 201. A frame 802 indicated by broken lines indicates the position of the picture frame before the line of sight changes, i.e., at the time of the state shown in FIG. 6. As can be understood from FIG. 8, before the line of sight changes, the pointer 501 is displayed in a state of being superposed with the virtual sphere A 302. The position of the pointer 501 changes due to a change in the direction of the line of sight, and is displayed in a state of being separated from the virtual sphere A 302. Accordingly, in order to designate the virtual sphere A 302, it is necessary to again move the pointer 501. The same operation must be performed if the direction of the line of sight changes due to fluctuation of the head after the movement. That is, in order to perform a stable operation, it is necessary to fix the operator's head mounting the HMD 201, resulting in a pain for the operator.

Although the above-described example represents a case of VR application software using an HMD, similar problems will arise in MR application software or telepresence application software. For example, in a telepresence system, when a camera is placed at a remote location, the photographing direction of the camera sometimes fluctuates due to mechanical factors or a change in the external environment caused by wind or the like. The above-described conventional approach cannot deal with such a problem because it presumes a state in which the position of the viewpoint and the direction of the line of sight are fixed.

SUMMARY OF THE INVENTION

It is an object of the present invention to solve the above-described problems.

It is another object of the present invention to allow to perform a stable input operation even if the direction of an operator's line of sight is unstable.

According to one aspect of the present invention, an information processing method for displaying an image in which a pointer image is synthesized includes the steps of detecting viewpoint information, inputting an instruction of an operator for operating a position of the pointer image, obtaining a designated direction in a pointer coordinate system in accordance with the operator's instruction, and generating the pointer image based on the designated direction. The pointer coordinate system is changed from the detected viewpoint information in accordance with a specific instruction of the operator.

According to another aspect of the present invention, an information processing apparatus includes a sensor adapted to detect viewpoint information of an operator, an operation unit adapted to input an instruction of the user for operating a position of a pointer image, a designated-direction determination unit adapted to obtain a designated direction in a pointer coordinate system in accordance with the instruction input to the operation unit, an image generation unit adapted to generate the pointer image based on the designated direction and synthesizing the pointer image with another image, and a display unit adapted to display a synthetic image generated by the image generation unit. The pointer coordinate system is changed from the detected viewpoint information in accordance with a specific instruction of the operator.

According to still another aspect of the present invention, in a program for realizing an information processing method for displaying an image in which a pointer is synthesized, the method includes the steps of detecting viewpoint information, inputting an instruction of an operator for operating a position of the pointer image, obtaining a designated direction in a pointer coordinate system in accordance with the operator's instruction, and generating the pointer image based on the designated direction. The program includes a program for changing the pointer coordinate system from the detected viewpoint information in accordance with a specific instruction of the operator.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described with reference to the drawings. In this embodiment, the above-described VR application software in which the operator mounts an HMD and designates a virtual sphere present in a virtual three-dimensional space is used. However, an input method different from the above-described method is adopted. The input method of this embodiment can be applied to arbitrary VR or MR application software, or telepresence application software.

Figure 9:
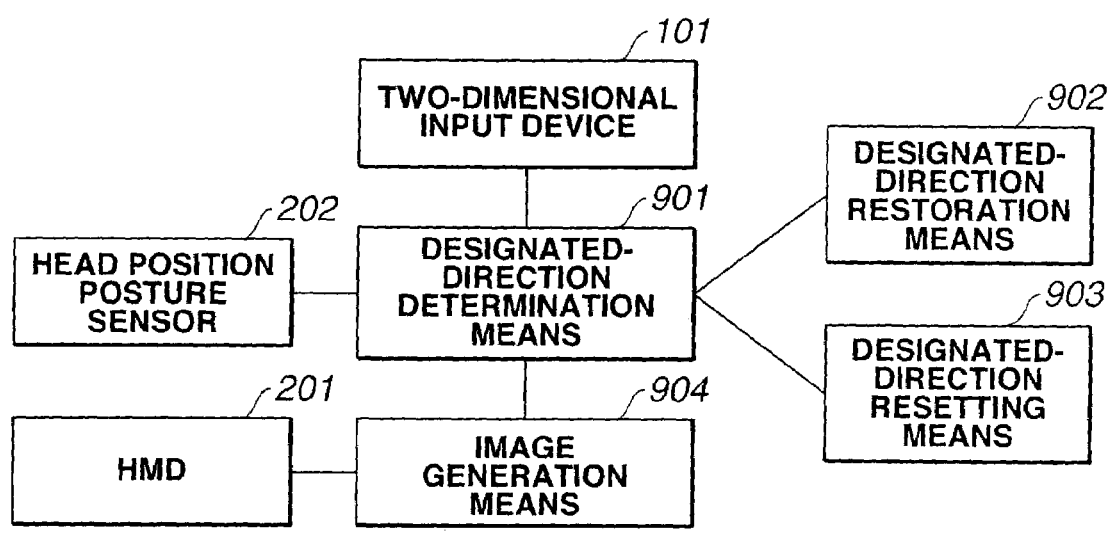
FIG. 9 is a block diagram illustrating an example of the configuration of an input method according to an embodiment of the present invention.

FIG. 9 is a block diagram illustrating an example of the configuration of the input method of the embodiment. In FIG. 9, there are shown a two-dimensional input device 101, a head position/posture sensor 202, an HMD 201, designated-direction determination means 901, designated-direction restoration means 902, designated-direction resetting means 903, and image generation means 904. Each of these units will now be described.

The two-dimensional input device 101 comprises, for example, a pointing stick. The operator can input two-dimensional values by operating the two-dimensional input device 101. Any other device that can input two-dimensional values, such as a mouse or the like, may also be used as the two-dimensional input device 101. The two-dimensional input device 101 may also comprise, for example, four buttons, i.e., upper and lower buttons, and left and right buttons. Two-dimensional values that are output are transmitted to the designated-direction determination means 901.

The head position/posture sensor 202 comprises, for example, a magnetic sensor mounted in the HMD 201, and outputs six degrees of freedom, i.e., the position (three degrees of freedom) and the posture (three degrees of freedom) of the viewpoint of the HMD 201, whenever necessary. The head position/posture sensor 202 is not always required to output six degrees of freedom. For example, when the position of the HMD 201 is fixed, the head position/posture sensor 202 is required to output only three degrees of freedom relating to the posture. Any other device that can output information relating to the position and the posture of the HMD 201, such as a rotary encoder or an optical sensor, may also be used as the head position/posture sensor 202. The position/posture information that is output is transmitted to the designated-direction determination means 901.

The HMD 201 presents an image from a viewpoint of the operator to the operator. The designated-direction determination means 901 receives two-dimensional values and the position/posture information of the HMD 201 from the two-dimensional input device 101 and the head position/posture sensor 202, respectively, and determines a designated direction. The designated-direction resetting means 903 resets the designated direction. The designated-direction restoration means 902 restores the designated direction. The image generation means 904 receives the designated-direction information and the position/posture information of the HMD 201 from the designated-direction determination means 901, draws a three-dimensional virtual space that can be accommodated within the field of view of the HMD 201, also draws a pointer representing the designated direction, and transmits the drawn image to the HMD 201.

Figure 10:
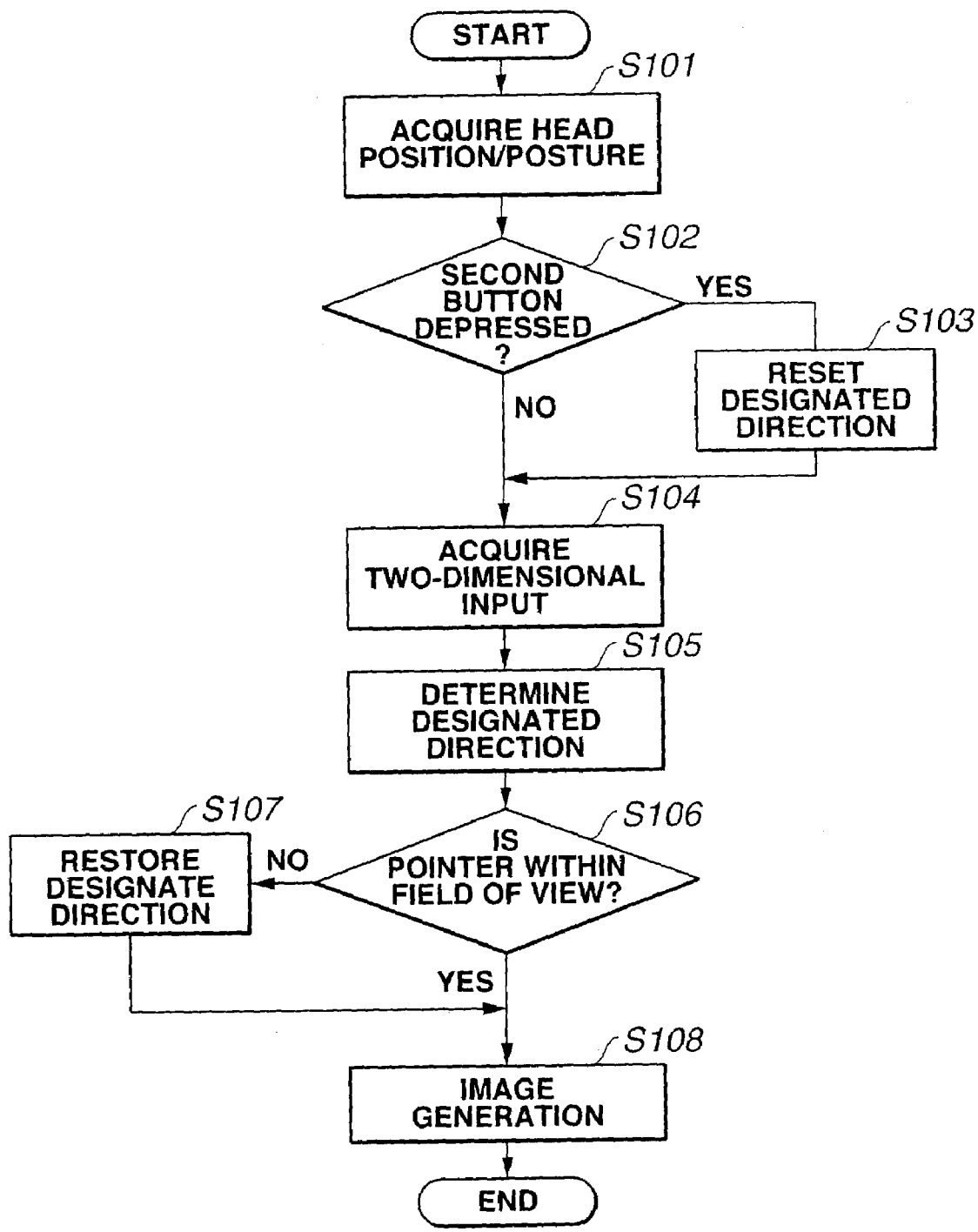
FIG. 10 is a flowchart illustrating a processing procedure of the input method of the embodiment.

FIG. 10 is a flowchart illustrating a processing procedure of the input method of the embodiment. The input method of the embodiment will now be sequentially described with reference to FIG. 10.

In step S101, the position and the posture of the HMD 201 are acquired from the head position/posture sensor 202. The acquired position/posture information is transmitted to the designated-direction determination means 901. In step S102, it is determined whether or not the second button 104 is depressed. If the result of the determination in step S102 is affirmative, the process proceeds to step S103. If the result of the determination in step S102 is negative, the process proceeds to step S104. In step S103, the designated direction is reset by the designated-direction resetting means 903.

Figure 11:
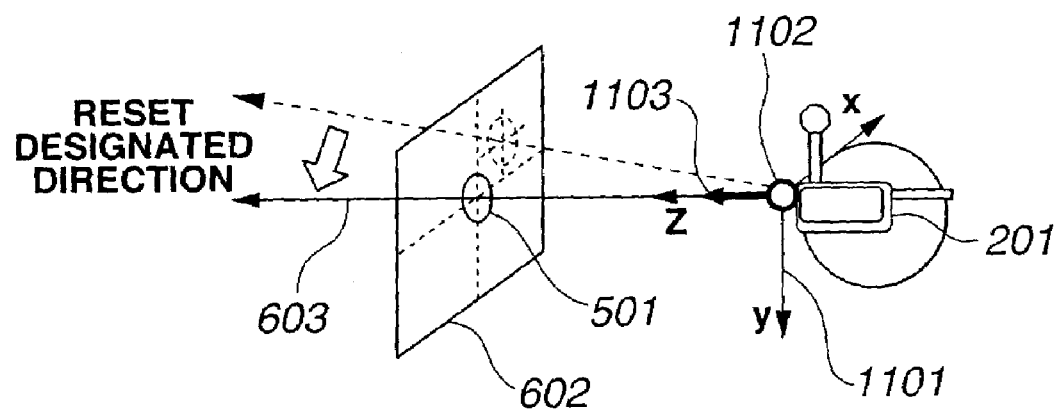
FIG. 11 is a diagram illustrating resetting of the designated direction in the input method of the embodiment.
Figure 12:
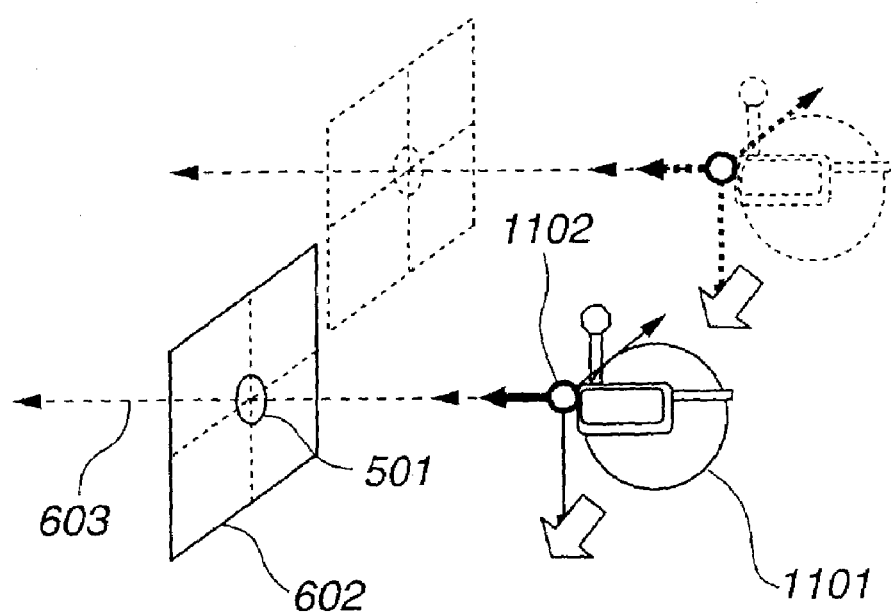
FIG. 12 is a diagram illustrating a pointer coordinate system when the position of a viewpoint is subjected to parallel movement, in the input method of the embodiment.
Figure 13:
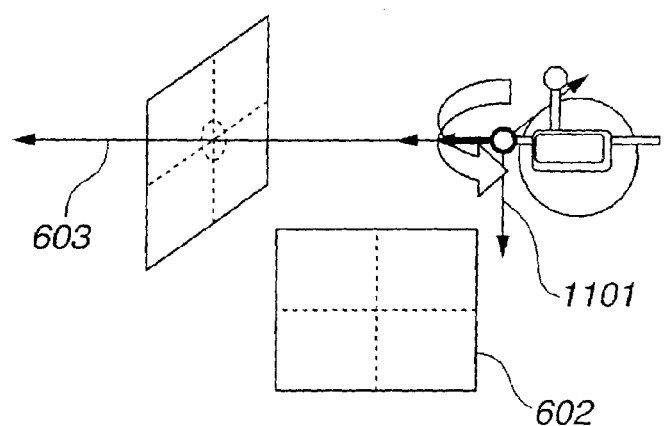
FIG. 13 is a diagram illustrating the pointer coordinate system when the direction of the line of sight changes, in the input method of the embodiment.

FIG. 11 is a diagram illustrating resetting of the designated direction. When the second button 104 has been depressed, the designated-direction resetting means 903 generates a pointer coordinate system 1101 based on the position/posture information of the HMD 201 obtained from the head position/posture sensor 202. In the pointer coordinate system 1101, a viewpoint position 1102 of the HMD 201 is made the origin, and the forward direction, the downward direction and the rightward direction are made the z axis, the y axis and the x axis, respectively. It is assumed that in the pointer coordinate system 1101, the position of the origin moves so as to be linked with the viewpoint position 1102, and the posture is always constant with respect to a world coordinate system 306. Accordingly, when the viewpoint position 1102 performs parallel movement as shown in FIG. 12, the pointer coordinate system 1101 moves together. However, when the direction of the line of sight changes as shown in FIG. 13, the pointer coordinate system 1101 does not change.

When the pointer coordinate system 1101 is generated, the designated-direction resetting means 903 simultaneously generates a direction vector 1103 having a magnitude of 1. A pointer 501 is drawn at the intersection of a straight line extended from the origin of the pointer coordinate system 1101 in the direction of the direction vector 1103 and an image plane 602. When resetting the designated direction, the pointer 501 is always at the center of the image plane 602, based on the definition of the pointer coordinate system 1101 and the direction vector 1103.

Figure 1:
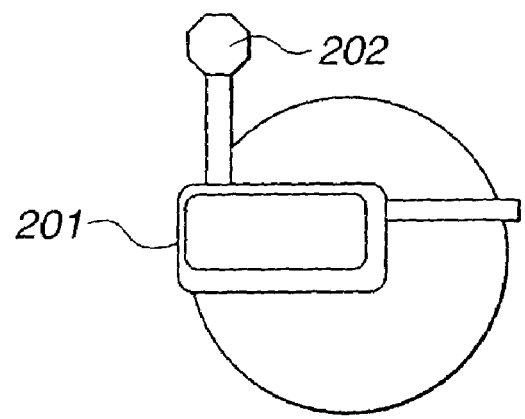
FIG. 1 is a diagram illustrating an HMD mounted on an operator.
Figure 2:
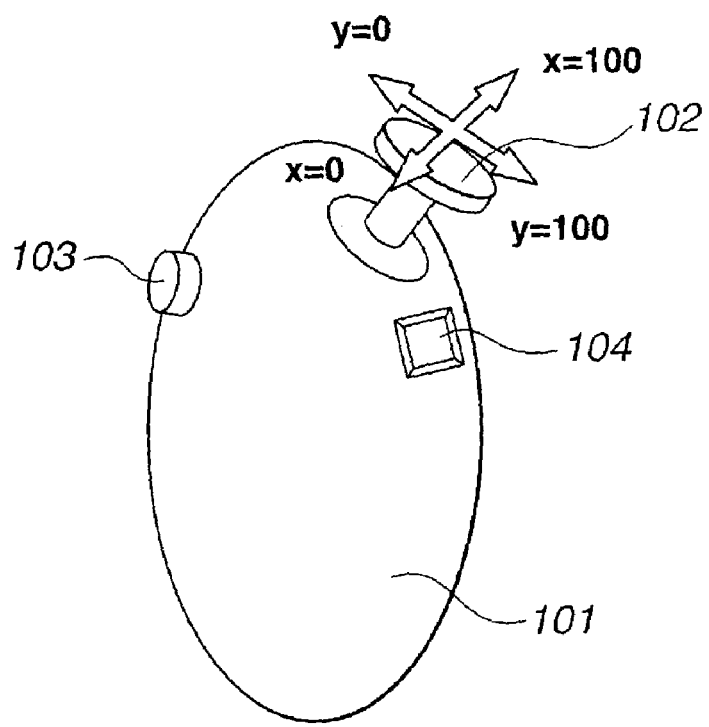
FIG. 2 is a diagram illustrating a two-dimensional input device held by a hand of the operator.
Figure 3:
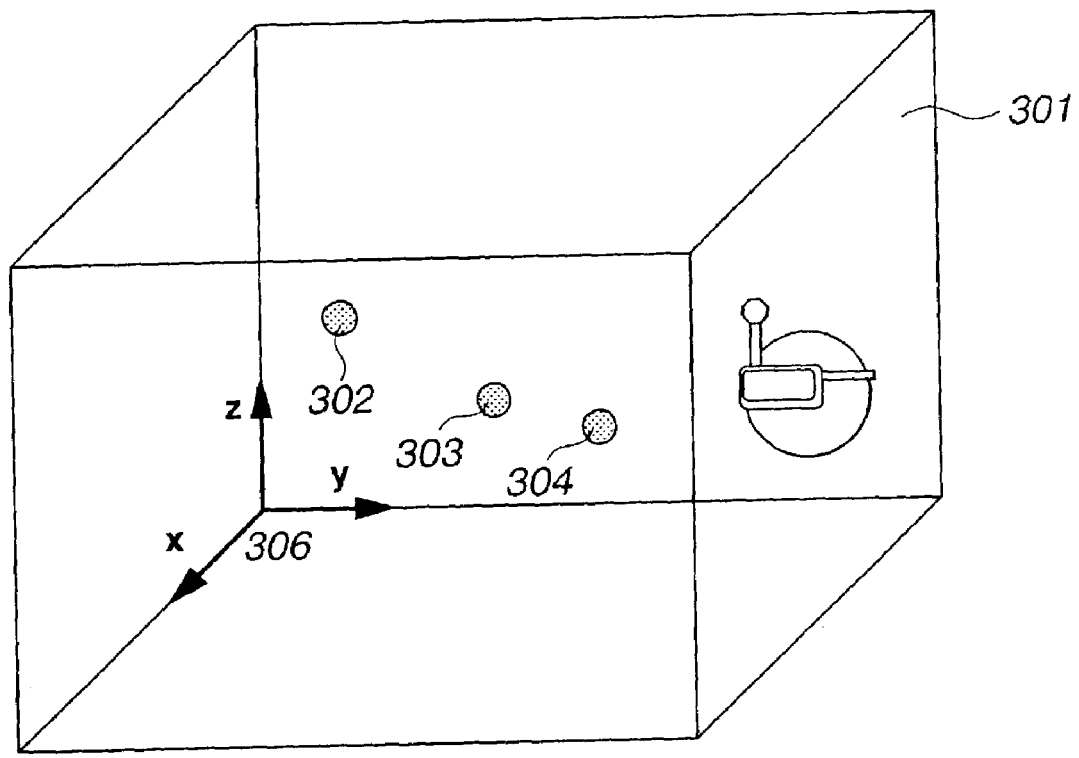
FIG. 3 is a diagram illustrating a three-dimensional virtual space presented to the operator.
Figure 4:
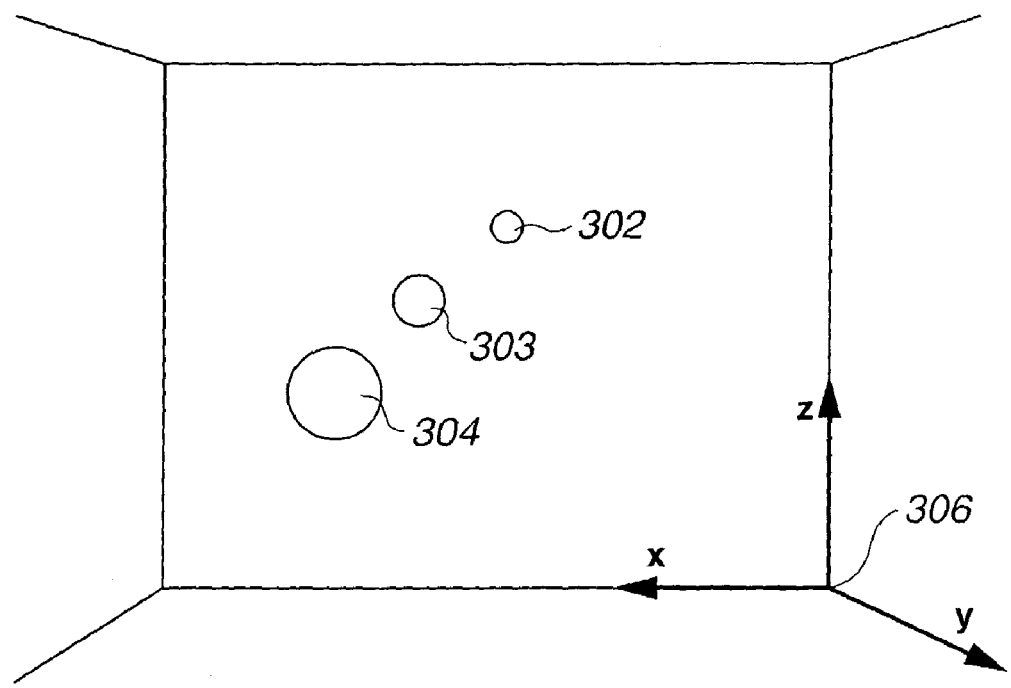
FIG. 4 is a diagram illustrating the three-dimensional virtual space as seen from a viewpoint of the operator.
Figure 5:
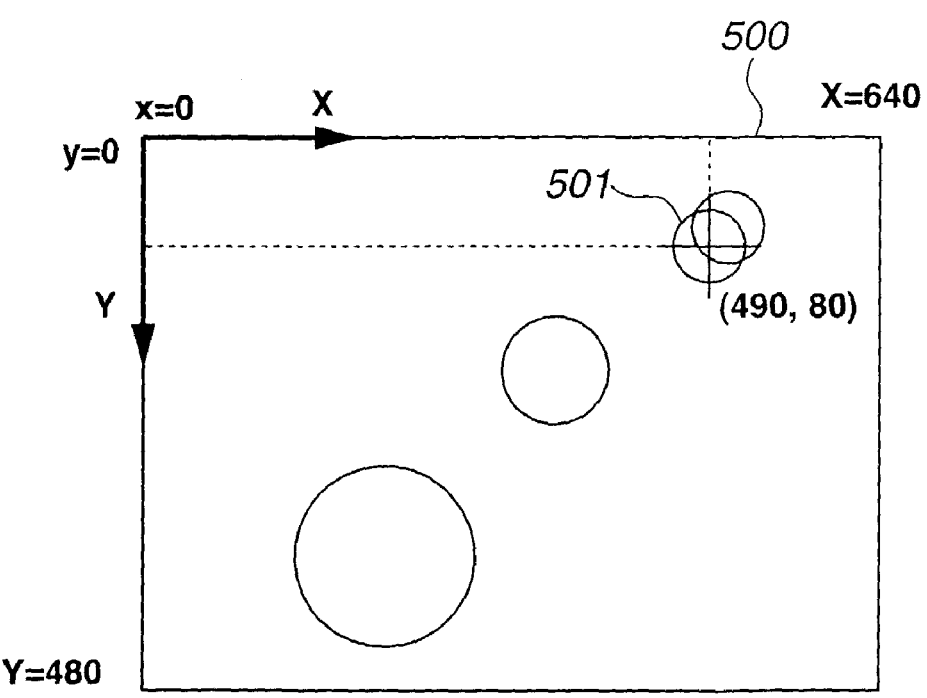
FIG. 5 is a diagram illustrating a picture frame displayed in the HMD of the operator.
Figure 6:
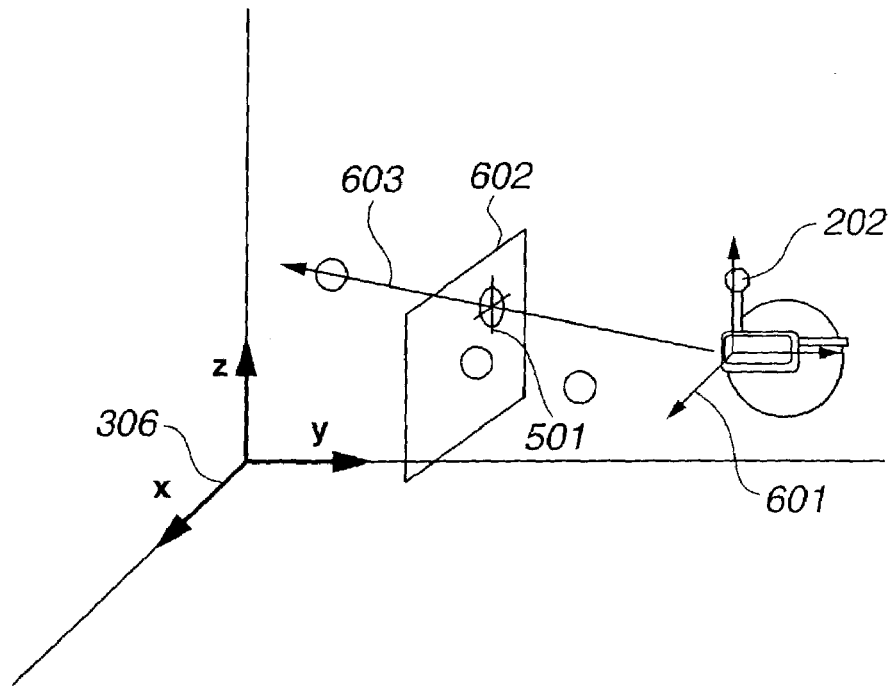
FIG. 6 is a diagram illustrating the relationship between a world coordinate system and a field-of-view coordinate system.

When the resetting of the designated direction in step S103 has been terminated, then, in step S104, two-dimensional input values are acquired from the two-dimensional input device 101. In this step, the operator can input two-dimensional values using the two-dimensional pointing stick 102 shown in FIG. 2. That is, as shown in FIG. 2, values (x, y)=(0, 0)–(100, 100) can be input depending on the direction and the angle of inclination of the pointing stick 102. The two-dimensional input values are transmitted to the designated-direction determination means 901.

Figure 14:
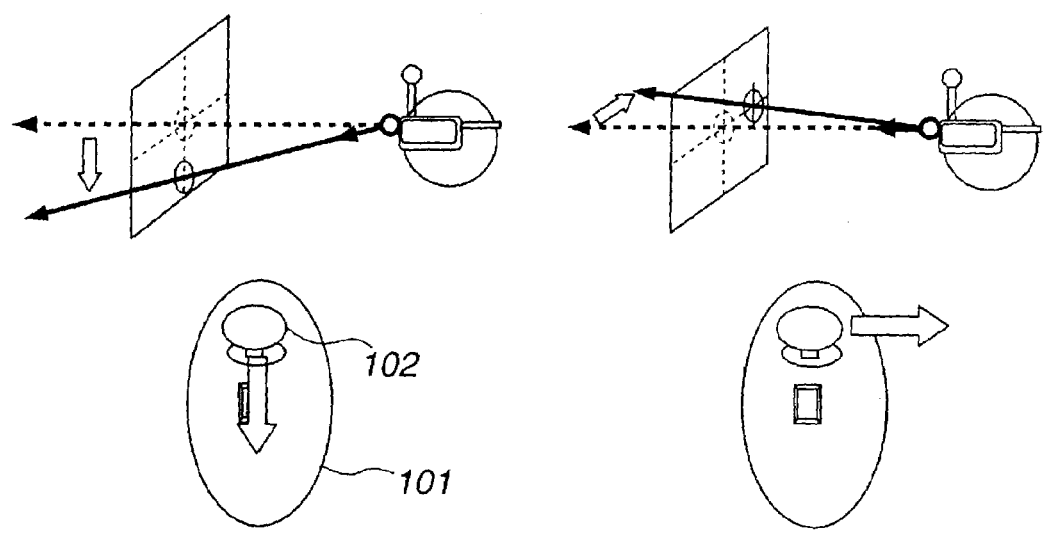
FIG. 14 is a diagram illustrating changes in the operation direction of a two-dimensional pointing stick and a direction vector, in the input method of the embodiment.

In step S105, the designated direction 603 is determined by the designated-direction determination means 901. The designated direction 603 is defined by a straight line extended from the origin of the pointer coordinate system 1101 in the direction of the direction vector 1103. As shown in FIG. 14, the direction vector 1103 changes so as to go downward and rightward when the two-dimensional pointing stick 102 is inclined downward and rightward, respectively.

Figure 19:
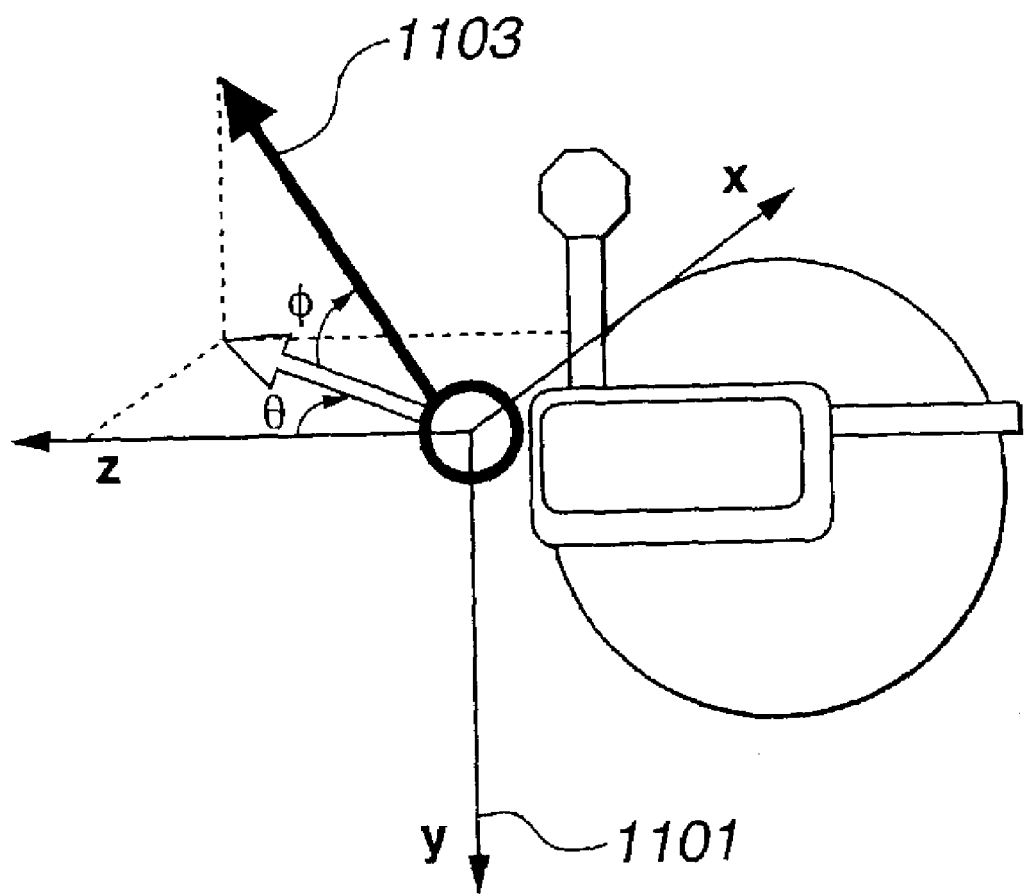
FIG. 19 is a diagram when a direction vector is represented by polar coordinates, in the input method of the embodiment.

In order to cause the directional vector 1103 to change as shown in FIG. 14, the relationship between two-dimensional values and the direction vector 1103 is defined, for example, in the following manner. As shown in FIG. 19, an angle made by the projection of the direction vector 1103 on the x-z plane of the pointer coordinate system 1101 with respect to the z axis is represented by θ, and an angle made by the direction vector 1103 having a magnitude of 1 with respect to the x-z plane of the pointer coordinate system 1101 is represented by Φ. Variations dθ and dΦ of θ and Φ, respectively, are defined as follows:

$$d\theta = (x1-50)/200\pi$$

$$d\Phi = (y1-50)/200\pi$$

where radians x1 and y1 are two-dimensional input values from the pointing stick.

By defining dθ and dΦ in the above-described manner and integrating the variations, it is possible to obtain the values of θ and Φ at a certain time, and operate the direction vector 1103 as shown in FIG. 14 according to the above-described equations.

When representing the direction vector 1103 in an orthogonal coordinate system using the values of θ and Φ, the following equations are used:

$$x = \sin\theta \cdot \cos\Phi$$

$$y = \sin\Phi$$

$$z = \cos\theta \cdot \cos\Phi.$$

Although the method of representing the direction vector 1103 using a polar coordinate system has been illustrated, any other method may also be adopted, provided that the direction of inclination of the pointing stick 102 coincides with the direction of change of the direction vector 1103, as shown in FIG. 14. For example, the following method may be adopted.

It is assumed that, when resetting the designated direction, the direction vector 1103 is represented by (x, y, z)=(0, 0, 1) in the pointer coordinate system 1101, where x changes in a lateral direction of the pointing stick 102, y changes in a longitudinal direction of the pointing stick 102, and z is invariable. Variations dx and dy of x and y, respectively, are defined as follows:

$$dx = (x1-50)/50$$

$$dy = (y1-50)/50,$$

where x1 and y1 are two-dimensional input values of the pointing stick 102. By defining dx and dy in the above-described manner and integrating the variations, it is possible to operate the direction vector 1103 as shown in FIG. 14 when the pointing stick 102 is moved.

Figure 15:
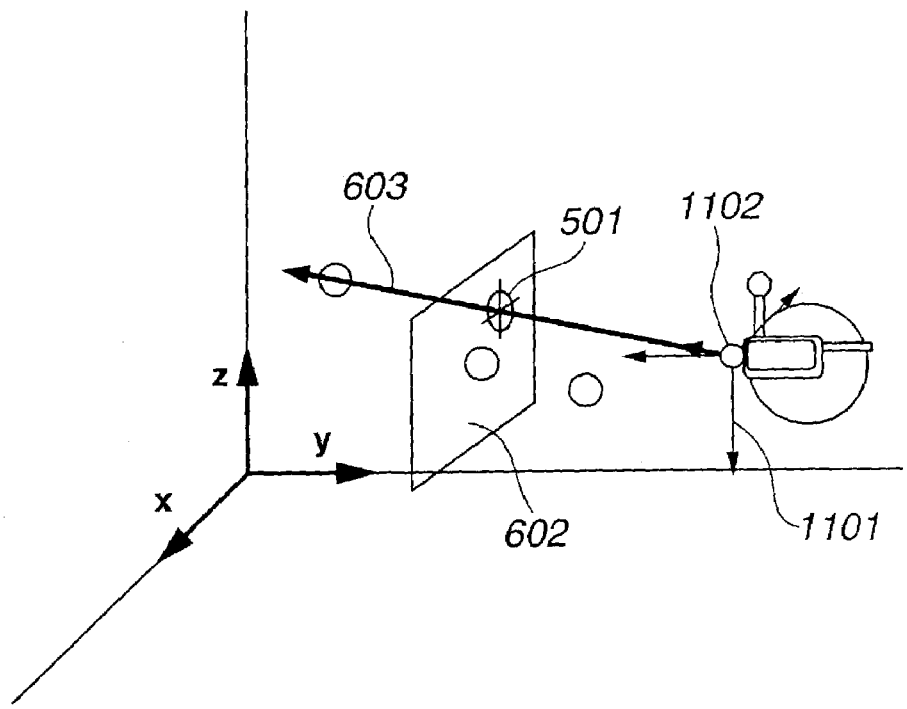
FIG. 15 is a diagram illustrating a state in which a virtual sphere is designated, in the input method of the embodiment.
Figure 16:
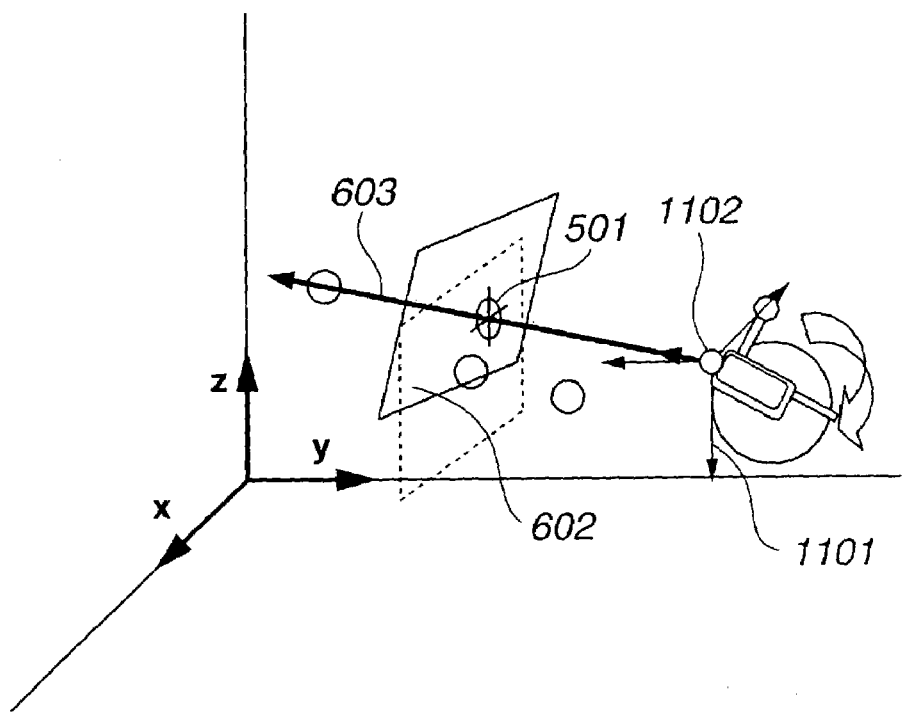
FIG. 16 is a diagram illustrating that the designated direction does not change even if the direction of the line of sight of the operator changes, in the input method of the embodiment.

The fact that, by defining the designated direction in the above-described manner, a stable input operation can be performed even if the direction of the line of sight of the operator is unstable will now be described with reference to FIGS. 15 and 16. FIG. 15 illustrates a state in which, after resetting the designated direction, the virtual sphere A 302 is designated by operating the two-dimensional input device 101. At that time, the direction vector 1103 is defined by the pointer coordinate system 1101, and the posture of the designated coordinate system 1101 is constant in the world coordinate system 306. Accordingly, even if the direction of the line of sight of the operator changes and the image plane 602 moves in the world coordinate system 306 as shown in FIG. 16, the designated direction 603 is constant in the world coordinate system 306, and remains to designate the virtual sphere A 302.

Figure 17:
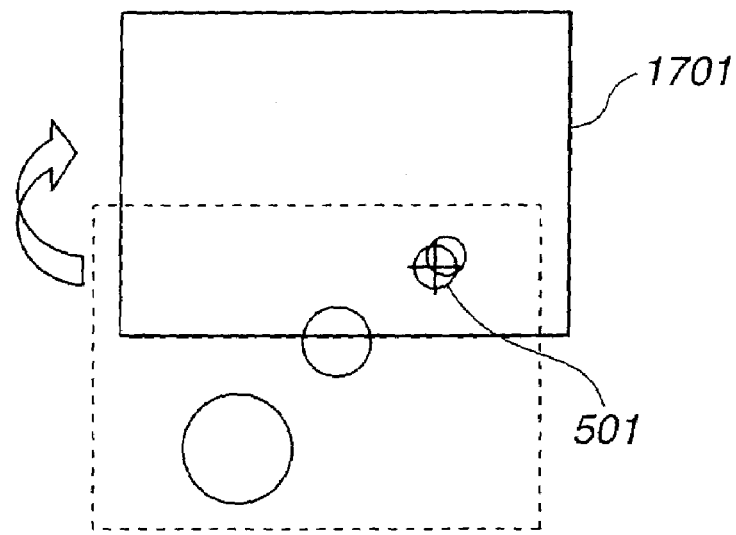
FIG. 17 is a diagram illustrating how the picture frame displayed in the HMD of the operator changes before and after the direction of the line of sight of the operator changes, in the input method of the embodiment.

FIG. 17 represents a picture frame 1701 displayed in the HMD 201 of the operator. A frame 1702 indicated by broken lines represents the position of the picture frame before the line of sight changes, i.e., at the time of the state shown in FIG. 15. As can be understood from FIG. 17, even if the direction of the line of sight changes, the pointer 501 remains to designate the virtual sphere A 302.

Figure 7:
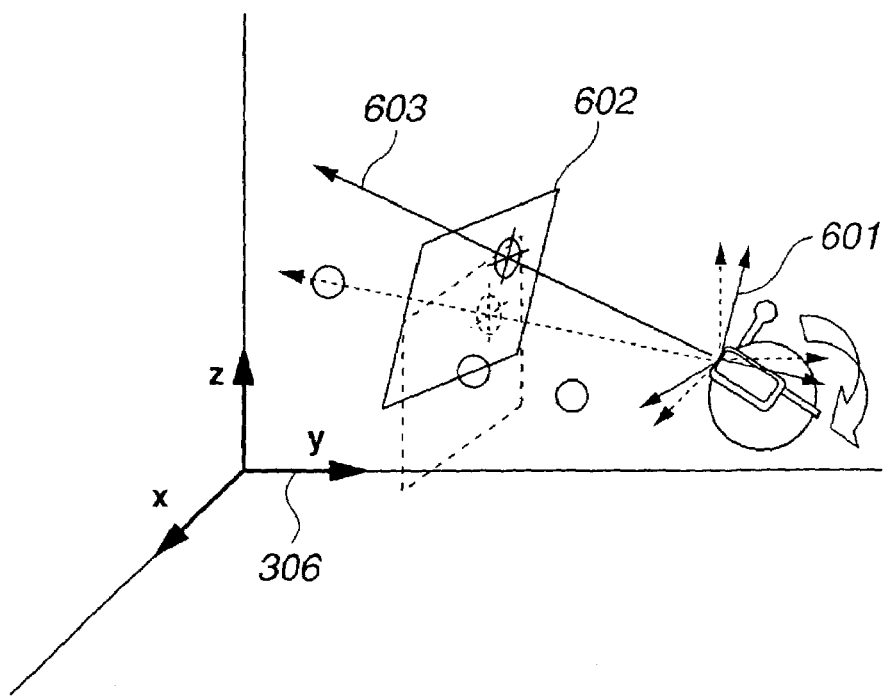
FIG. 7 is a diagram illustrating how a designated direction of the operator changes when the direction of the line of sight of the operator changes, in a conventional input method.
Figure 8:
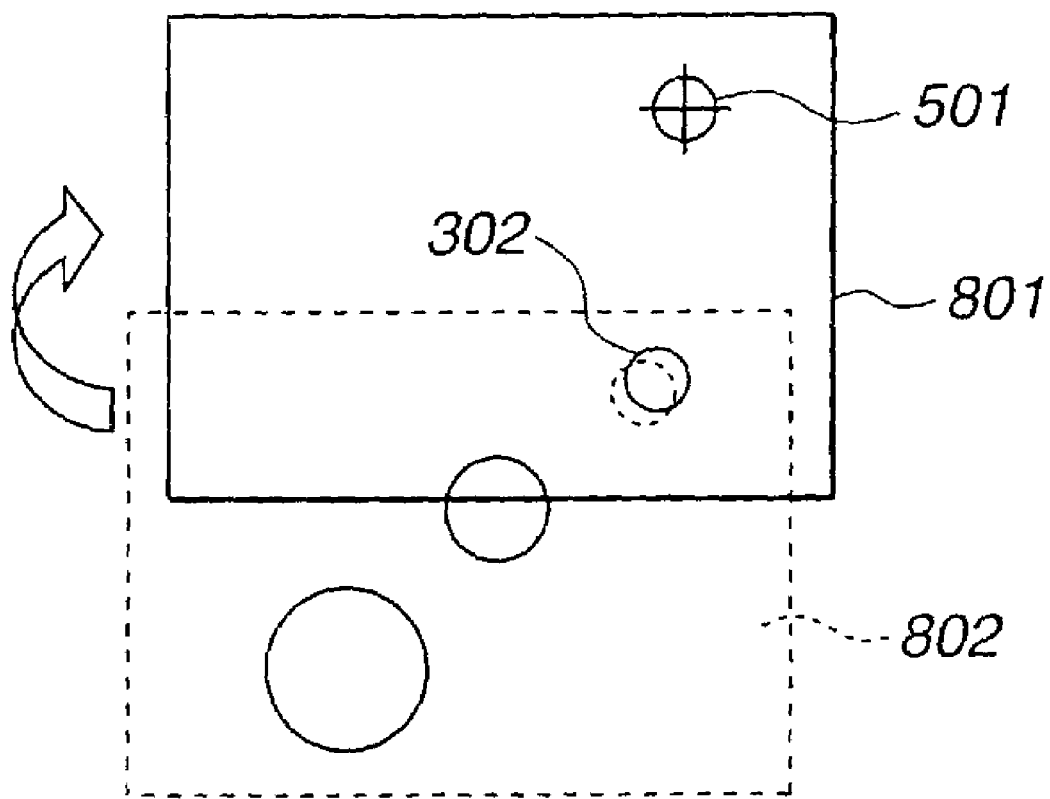
FIG. 8 is a diagram illustrating how the picture frame shown in the HMD of the operator changes before and after the direction of the line of sight of the operator changes, in the conventional input method.

While in the conventional approach, as shown in FIGS. 7 and 8, the designated direction 603 greatly changes when the direction of the line of sight changes, it can be understood the method of the present invention can perform a stable input operation.

After determining the designated direction 603 in step S105 in the above-described manner, then, in step S106, it is determined by the designated-direction restoration means 902 whether or not the pointer 501 is within the field of view. This step is performed in order to prevent a case in which the operator loses sight of the designated direction 603. If the result of the determination in step S106 is affirmative, the process proceeds to step S108. If the result of the determination in step S106 is negative, the process proceeds to step S107.

Figure 18:
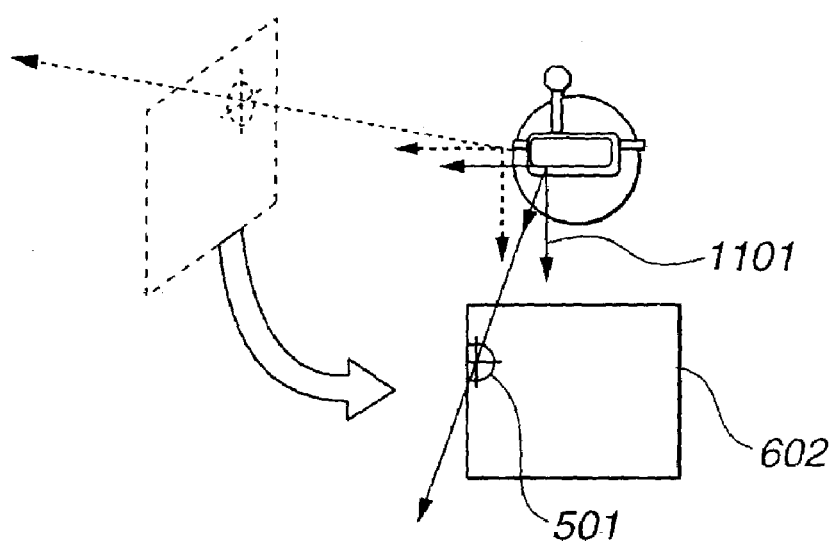
FIG. 18 is a diagram illustrating restoration of the designated direction when a pointer becomes off the field of view.

In step S107, the designated direction 603 is restored. The restoration of the designated direction 603 is performed by moving the pointer coordinate system 1101 as shown in FIG. 18. As shown in FIG. 18, by setting the z axis of the designated coordinate system 1101 within the field of view to set the direction vector 1103 on the z axis, it is possible to again accommodate the pointer 501 within the field of view.

In step S108, the image generation means 904 generates an image to be presented to the operator. The image generation means 904 generates a CG (computer graphics) image based on the position/posture information of the HMD 201 acquired in step S101, and also draws the pointer 501 at an intersection of the designated direction 603 determined in step S105 or step S107 and the image plane 602.

As described above, according to the present invention, it is possible to provide a method for performing a stable input operation using two-dimensional input means, even if the direction of the line of sight of the operator is unstable when the operator performs an operation while seeing a picture frame seen from the operator's viewpoint for a virtual or real three-dimensional space in VR or MR application software or telepresence application software.

(Other Embodiments)

The above-described embodiment uses VR application software in which only a three-dimensional virtual space is presented to the operator. However, the present invention may also be applied to MR application software that presents not only a three-dimensional virtual space but also a real three-dimensional space to the operator. The input method of the present invention may also be applied to telepresence application software.

Although in the above-described embodiment, the operator performs an operation of designating a virtual object present in a three-dimensional virtual space, the input method of the present invention may also be applied to an operation of designating a real object in MR application software or telepresence application software.

Although in the above-described embodiment, an HMD is used as a device for presenting a space to the operator, any other device may also be used provided that an image can be presented to the operator, such as a mere monitor. Such a configuration is adopted, for example, when the operator sees an image taken by a robot camera from a remote location.

In the above-described embodiment, in step S103 of the processing procedure, the pointer coordinate system 1101 is defined as a coordinate system in which the viewpoint position 1102 of the HMD 201 is made the origin, and the forward direction, the downward direction and the rightward direction are made the z axis, the y axis and the x axis, respectively. However, the pointer coordinate system 1101 is not necessarily defined in the above-described manner, but may be defined in any other appropriate manner provided that the position is linked with the viewpoint position 1102, and the posture is fixed in the world coordinate system 306.

Although in the above-described embodiment, in step S106 of the processing procedure, it is determined whether or not the pointer 501 is within the field of view, this step may be omitted. In such a case, although there exists a moment in which the pointer 501 is not within the field of view, this input method is more effective depending on the type of application software.

Although in the above-described embodiment, a pointer is used in order to represent the designated direction on a picture frame, any other appropriate device may also be used provided that the designated direction can be represented on a picture frame. For example, a virtual three-dimensional object, such as a laser or the like, for representing the designated direction may be used.

The objects of the present invention may also be achieved by supplying a computer within an apparatus or a system connected to various devices so as to operate the various devices in order to realize the functions of the above-described embodiments with program codes of software for realizing the functions of the above-described embodiments, and operating the various devices in accordance with a program stored in the computer (or a CPU (central processing unit) or an MPU (microprocessor unit)) of the system or the apparatus.

In such a case, the program codes themselves of the software realize the functions of the above-described embodiments, so that the program codes themselves, or means for supplying the computer with the program codes, such as a storage medium storing the program codes, constitutes the present invention.

For example, a flexible disk, a hard disk, an optical disk, a magnetooptical disk, a CD(compact disc)-ROM (read-only memory), a magnetic tape, a nonvolatile memory card, a ROM or the like may be used as the storage medium storing the program codes.

Such program codes, of course, constitute the present invention not only when the functions of the above-described embodiments are realized by executing supplied program codes by a computer, but also when the functions of the above-described embodiments are realized by the program codes in cooperation with an OS (operating system), other application software or the like operating in the computer.

The present invention may, of course, also be applied to a case in which, after storing supplied program codes in a memory provided in a function expanding board of a computer or in a function expanding unit connected to the computer, a CPU or the like provided in the function expanding board or the function expanding unit performs a part or the entirety of actual processing, and the functions of the above-described embodiments are realized by the processing.

The individual components shown in outline or designated by blocks in the drawings are all well known in the information processing method and apparatus arts and their specific construction and operation are not critical to the operation or the best mode for carrying out the invention.

Although the present invention has been described above with respect to the preferred embodiments, the invention is not limited to the foregoing embodiments but many other modifications and variations are possible within the spirit and scope of the appended claims of the invention.

What is claimed is:

1. An information processing method for synthesizing a pointer image in a displayed image, said method comprising the steps of:
   detecting a position and an orientation of a viewpoint upon which the displayed image is based;
   inputting an instruction of an operator for operating a position of the pointer image;
   changing a pointer coordinate system in response to an instruction of the operator, wherein the pointer coordinate system is changed to a pointer coordinate system that is based on the detected viewpoint;
   obtaining a designated direction in the pointer coordinate system in accordance with the instruction of the operator for operating the position of the pointer image; and
   synthesizing the pointer image in the displayed image, wherein the pointer image is synthesized based on the designated direction,
   wherein a position of said pointer coordinate system is linked to said position of the viewpoint, and orientation of said pointer coordinate system is not linked to said orientation of the viewpoint.

2. An information processing method according to claim 1, wherein the displayed image is a virtual image.

3. An information processing method according to claim 1, wherein
   said orientation of the pointer coordinate system is fixed in a world coordinate system.

4. An information processing method according to claim 1, wherein it is determined whether or not the designated direction is off a field of view, and wherein the designated direction is moved within the field of view if the designated direction is determined to be off the field of view.

5. An information processing apparatus comprising:
   a sensor adapted to detect a position and an orientation of a viewpoint of an operator upon which a displayed image is based;
   an operation unit adapted to input an instruction of the operator for operating a position of a pointer image;
   a designated-direction resetting unit adapted to change a pointer coordinate system in response to an instruction of the operator, wherein the pointer coordinate system is changed to a pointer coordinate system that is based on the detected viewpoint;
   a designated-direction determination unit adapted to obtain a designated direction in the pointer coordinate system in accordance with the instruction of the operator for operating the position of the pointer image;

an image generation unit adapted to synthesize the pointer image in the displayed image, wherein the pointer image is synthesized based on the designated direction; and a display unit adapted to display a synthetic image generated by said image generation unit, wherein a position of said pointer coordinate system is linked to said position of the viewpoint, and orientation of said pointer coordinate system is not linked to said orientation of the viewpoint.

6. An information processing apparatus according to claim 5, wherein said display unit comprises a head mounted display.

7. An information processing apparatus according to claim 5, wherein said operation unit comprises two-dimensional input means.

8. Computer-executable program instructions stored on computer-readable medium, the program instructions executable to realize an information processing method for synthesizing a pointer image in a displayed image, said method comprising the steps of:

detecting a position and an orientation of a viewpoint upon which the displayed image is based;

inputting an instruction of an operator for operating a position of the pointer image;

changing a pointer coordinate system in response to an instruction of the operator, wherein the pointer coordinate system is changed to a pointer coordinate system that is based on the detected viewpoint;

obtaining a designated direction in the pointer coordinate system in accordance with the instruction of the operator for operating the position of the pointer image; and synthesizing the pointer image in the displayed image, wherein the pointer image is synthesized based on the designated direction, wherein a position of said pointer coordinate system is linked to said position of the viewpoint, and orientation of said pointer coordinate system is not linked to said orientation of the viewpoint.

9. An information processing method for synthesizing a pointer image in a displayed image, said method comprising the steps of:

obtaining a position and an orientation of a viewpoint upon which the displayed image is based;

generating a virtual image based on the position and the orientation of the viewpoint;

setting a position of a pointer coordinate system corresponding to the position of the viewpoint;

obtaining a designated direction for operating the position of the pointer image in the pointer coordinate system in accordance with an instruction of an operator; and combining the pointer image and said display image according to said designated direction and said pointer coordinate system, wherein the orientation of said pointer coordinate system does not correspond to the orientation of the viewpoint.

10. An information processing method according to claim 9, wherein the orientation of said pointer coordinate system is set according to the orientation of the viewpoint when inputting a predetermined instruction from said operator.

11. An information processing apparatus comprising:

a sensor adapted to obtain a position and an orientation of a viewpoint upon which the displayed image is based;

a virtual image generation unit adapted to generate a virtual image based on the position and the orientation of the viewpoint;

a position setting unit adapted to set a position of a pointer coordinate system corresponding to the position of the viewpoint;

a designated-direction determination unit adapted to obtain a designated direction for operating the position of the pointer image in the pointer coordinate system in accordance with an instruction of an operator; and an image combining unit adapted to combine the pointer image and said display image according to said designated direction and said pointer coordinate system, wherein the orientation of said pointer coordinate system does not correspond to the orientation of the viewpoint.

12. Computer-executable program instructions stored on computer-readable medium, the program instructions executable to realize an information processing method for synthesizing a pointer image in a displayed image, said method comprising the steps of:

generating a virtual image based on the position and the orientation of the viewpoint;

setting a position of a pointer coordinate system corresponding to the position of the viewpoint;

obtaining a designated direction for operating the position of the pointer image in the pointer coordinate system in accordance with an instruction of an operator; and combining the pointer image and said display image according to said designated direction and said pointer coordinate system, wherein the orientation of said pointer coordinate system does not correspond to the orientation of the viewpoint.

* * * * *

UNITED STATES PATENT AND TRADEMARK OFFICE
CERTIFICATE OF CORRECTION

PATENT NO. : 7,123,214 B2  
APPLICATION NO. : 10/395176  
DATED : October 17, 2006  
INVENTOR(S) : Tsuyoshi Kuroki et al.

It is certified that error appears in the above-identified patent and that said Letters Patent is hereby corrected as shown below:

DRAWINGS:  
Sheet 7, Figure 10, "RESTORE DESIGNATE" should read -- RESTORE DESIGNATED DIRECTION --.

COLUMN 1:  
Line 27, "thee-dimensional" should read -- three-dimensional --; and  
Line 48, "thee-dimen-" should read -- three-dimen- --.

Signed and Sealed this

Fourth Day of March, 2008

JON W. DUDAS  
*Director of the United States Patent and Trademark Office*